Jan. 21, 1964     L. PERAS     3,118,701
WEATHERSTRIPS FOR VEHICLE BODIES
Filed Dec. 27, 1961
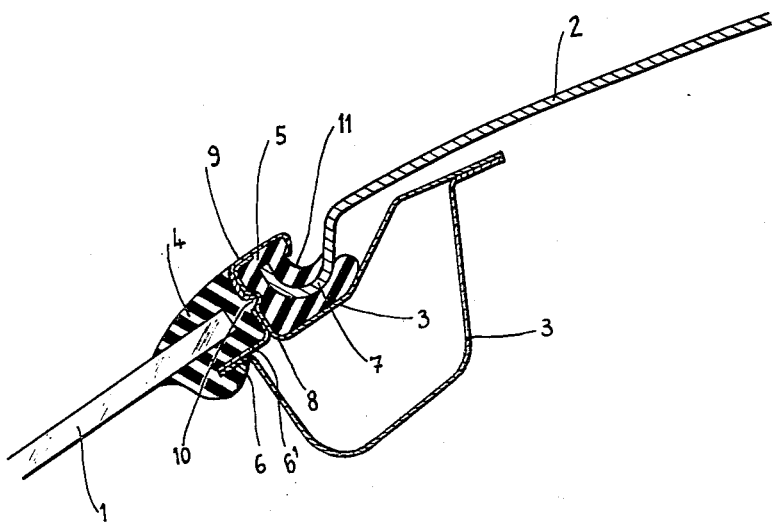
INVENTOR
Lucien Péras
By Stevens, Davis, Miller + Mosher
ATTORNEYS

3,118,701
WEATHERSTRIPS FOR VEHICLE BODIES
Lucien Péras, Billancourt, France, assignor to Regie Nationale des Usines Renault, Billancourt, France
Filed Dec. 27, 1961, Ser. No. 162,495
Claims priority, application France Jan. 17, 1961
1 Claim. (Cl. 296—93)

This invention relates to a weatherstrip for vehicle bodies, whereby three parts, that is, the windscreen, backlight or glass, the top and the glass frame rigid with the body of the vehicle, can be assembled. In addition, with the construction according to this invention it is possible to provide a rainstrap incorporated in the general line of the top and of the body without appreciably interfering with the streamlining.

In the single figure of the attached drawing a typical example of a weatherstrip constructed according to the teachings of this invention is shown in cross section.

Referring to the drawing, the reference numeral 1 designates the glass or windscreen, 2 is the top and 3 the glass frame rigid with the body of the vehicle. The weatherstrip proper comprises two elements 4, 5.

The glass or windshield 1 is secured on the box-sectioned glass frame 3 by means of a weatherstrip element 4 anchored in the marginal portion or lip 6 of the frame. The top 2 is formed along its edge with an integral rainstrap 7 having anchored thereon the element 5 which is subsequently fitted into the channel-shaped edge 8 of the glass frame 3. The lip 6 is solid with a parallel flange $6^1$ of an angle member having its other flange rigid with the aforesaid channel-shaped edge 8, as shown. The weatherstrip element 5 is firmly kept in position in this channel 8 by the frame member 9 fitted in a groove 10 formed in the same channel 8, this frame member 9 being folded over the element 5 to constitute the rainstrap 11. This frame member 9 may if desired constitute an ornamental beading to enhance the glass frame and the outer edge of the top.

This arrangement is characterized by the following advantageous features in comparison with the conventional spotwell assembly:

(1) The rainstrap incorporated in the general line of the top and glass or windscreen constitutes an arrangement whereby making spot welds in the bottom of the rainstrap is rendered particularly inconvenient.

(2) Very simple and rapid fitting and refitting.

(3) Extremely water-tight assembly.

Of course, this type of assembly is applicable to any other sheet-metal assemblies as well as to any construction involving the assembling of other parts with one another. Besides, various modifications and variations may be brought to the single example shown and described herein, without however departing from the spirit and scope of the invention as set forth in the appended claim.

I claim:

In an automotive vehicle having a roof and a fixed glass, a joint connecting the roof and the glass together, said joint comprising a down-turned channel edge on the roof defining a rain gutter, a frame having a portion interposed between the channel edge and the glass and including a U-shaped portion embracing in spaced fashion the channel edge, a first resilient member fitted tightly in said U-shaped part and tightly overlying the channel edge, said frame having an angular part extending oppositely to the U-shaped part, a second resilient member having a groove receiving the edge of the glass and tightly fitted in the angular part and means securing the second resilient member to the angular part with the second resilient member having its outer surface and said U-shaped part having an outer leg that is in a plane constituting a prolongation of the downward plane of the roof.

References Cited in the file of this patent
UNITED STATES PATENTS
2,456,175    Coppock _____ Dec. 14, 1948